United States Patent [19]

Inoue et al.

[11] Patent Number: 4,634,885
[45] Date of Patent: Jan. 6, 1987

[54] APPARATUS FOR DRIVING CCD-SENSOR

[75] Inventors: Yasuo Inoue, Yokohama; Masaharu Tadauchi, Hitachi, both of Japan

[73] Assignee: Hitachi, Ltd, Tokyo, Japan

[21] Appl. No.: 554,724

[22] Filed: Nov. 23, 1983

[30] Foreign Application Priority Data

Nov. 25, 1982 [JP] Japan .................. 57-205458

[51] Int. Cl.⁴ .................. H01J 40/14; H09N 3/14
[52] U.S. Cl. .................. 250/578; 358/213
[58] Field of Search .................. 250/578, 559, 204; 358/212, 213; 357/24

[56] References Cited

U.S. PATENT DOCUMENTS

| | | | |
|---|---|---|---|
| 3,944,816 | 3/1976 | Harada | 358/213 |
| 4,382,267 | 5/1983 | Angle | 358/213 |
| 4,396,950 | 8/1983 | Roth | 358/213 |
| 4,471,228 | 9/1984 | Nishizawa et al. | 250/578 |
| 4,479,062 | 10/1984 | Kawasaki et al. | 250/578 |

FOREIGN PATENT DOCUMENTS

| | | |
|---|---|---|
| 2821240 | 11/1978 | Fed. Rep. of Germany . |
| 2748325 | 12/1978 | Fed. Rep. of Germany . |
| 2804979 | 7/1981 | Fed. Rep. of Germany . |
| 3109072 | 4/1982 | Fed. Rep. of Germany . |

Primary Examiner—David C. Nelms
Assistant Examiner—William L. Oen
Attorney, Agent, or Firm—Antonelli, Terry & Wands

[57] ABSTRACT

An apparatus for driving a CCD-sensor used in a reader for facsimile. Charge storage time of the CCD-sensor is determined on the basis of detected quantity of light for illuminating a document to be read. The CCD-sensor is driven periodically at a time interval corresponding to the storage time thus determined so that an output signal resulting from the photoelectric conversion effected by the CCD-sensor may remain steady regardless of variations in the quantity of illuminating light.

9 Claims, 14 Drawing Figures

APPARATUS FOR DRIVING CCD-SENSOR

BACKGROUND OF THE INVENTION

The present invention relates to an apparatus for driving an optical sensor constituted by a charge-coupled device (hereinafter referred to as CCD-sensor) and used in facsimile equipment and the like. More particularly, the invention concerns a CCD-sensor driving apparatus which is arranged such that the quantity of light emitted by a light source is detected to thereby determine the storage time of the CCD in dependence on the detected quantity of light, whereby the CCD-sensor is driven periodically at a time interval corresponding to the determined storage time so that output signal resulting from photoelectric conversion effected by the CCD-sensor may remain steady independent of variations in the quantity of light of the light source.

The CCD which has come into the world as a development of the MOS technology is generally categorized into a charge-transfer device which term also covers a bucket brigade device (BBD) and others. In contrast to the semiconductor devices such as bipolar and unipolar elements whose operation is based on the thermally balanced condition, the concept of operation of the CCD is unique in that mobile charge (minority carriers) is shifted between temporary storage sites referred to as the potential-energy wells in the thermally balanced state. By virtue of this unique operation, the CCD is made use of in a wide variety of applications such as imagers, facsimile equipment and others.

FIG. 1 of the accompanying drawings shows in a block diagram an arrangement of a reader system for a facsimile equipment which incorporates a fluorescent lamp as the light source together with a CCD-sensor driving apparatus of a hitherto known structure. Referring to the figure, a document 1 containing information is illuminated with a fluorescent lamp 2 and light information is directed to a CCD-sensor 4 by way of a lens system 3 to undergo photoelectric conversion. The CCD-sensor 4 responds to a start signal (START) produced by a start pulse generator 5 to output an electric information signal which is then applied to an inverting input terminal of an operational amplifier 7 through a resistor $R_1$. Connected in parallel with the operational amplifier 7 is an automatic gain control circuit 6 which operates in response to the output of the CCD-sensor 4 to stabilize the video output signal (VIDEO) of the operational amplifier 7. FIG. 2 shows signal waveforms for illustrating operation of the apparatus shown in FIG. 1. Referring to FIG. 2, every time the pulse signal "START" is produced by the start pulse generator 5, a signal representative of information of the document 1 resulting from photoelectric conversion is obtained from the output of the CCD-sensor 4. It should be noted that the pulse signal "START" is produced at a predetermined fixed period or time interval $t_1$. The waveform 2a shown in FIG. 2 represents the output signal of the CCD-sensor 4 produced when the document 1 being read under illumination with a standard quantity of light of the fluorescent lamp 2 is either white or black. The waveform 2b represents the output signal of the CCD-sensor 4 produced upon reading the white areas of the document under illumination with a decreased quantity of light, while the waveform 2c represents the output signal of the CCD-sensor 4 produced upon reading black areas of the document under illumination with the standard quantity of light. It will be seen that peak values $V_{p2}$ and $V_{p3}$ of the signals 2b and 2c are smaller than the peak value $V_{p1}$ of the waveform 2a, i.e. $V_{p2} < V_{p1}$ and $V_{p3} < V_{p1}$. For these waveforms 2a, 2b and 2c, the output signal "VIDEO" of the operational amplifier 7 assumes a peak value $V_{p0}$ under the control of the AGC circuit 6. As the consequence, there may arise such an undesirable situation in which white and black information is confused with each other to bring about erroneous discrimination because of the fact that both information (waveform 2b) read from the white portion of the document under illumination with a decreased quantity of light and information (waveform 2c) read from the black portion of the document under illumination with the standard quantity of light take the utterly same peak level $V_{p0}$ in the signal "VIDEO". This is a serious disadvantage of the hitherto known apparatus shown in FIG. 1.

SUMMARY OF THE INVENTION

It is an object of the present invention to provide an apparatus for driving a CCD-sensor adapted for reading information from documents and the like through photoelectrical conversion which apparatus eliminates the problems encountered in hitherto known apparatus described above and allows information to be read with improved fidelity and reliability independent of variations in the quantity of light emitted by a light source in a facsimile equipment or the like.

In view of the above object, there is provided according to an aspect of the invention a CCD-sensor driving apparatus in which a light quantity detecting element is used for controlling or determining the charge storage time of the CCD-sensor in dependence on variations in the quantity of light for illumination, wherein the CCD-sensor is periodically driven at a time interval corresponding to the storage time thus determined.

BRIEF DESCRIPTION OF THE DRAWINGS

The above and other objects, advantage and features of the invention will be apparent from the description of the preferrered embodiments taken in conjunction with the accompanying drawings, in which.

DESCRIPTION OF THE PREFERRED EMBODIMENTS

Figure 3:
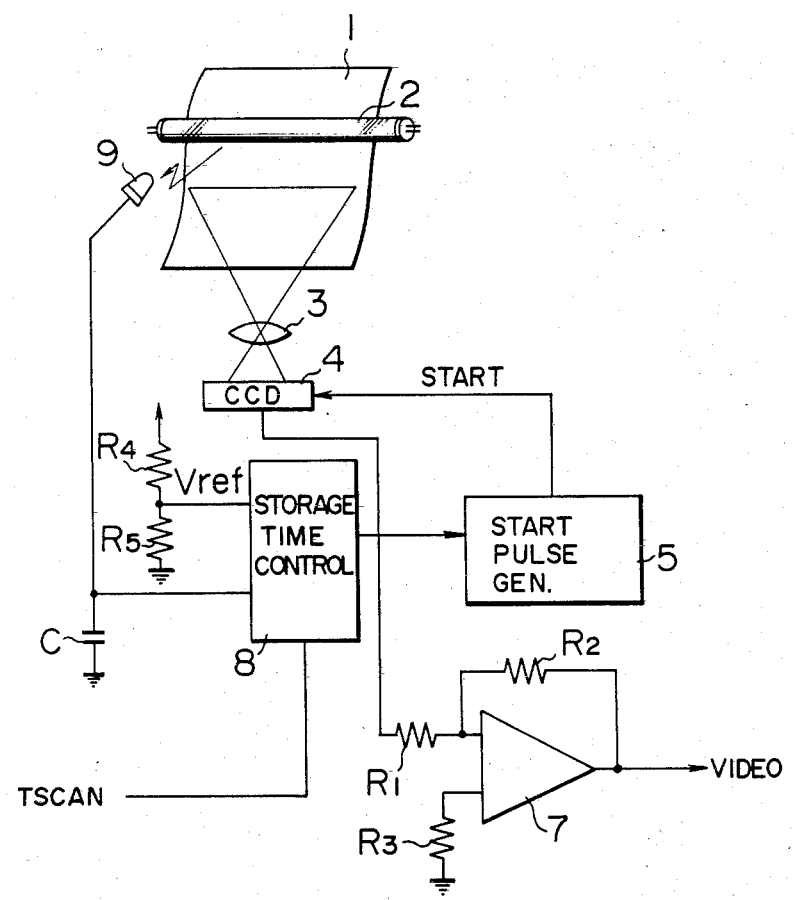
FIG. 3 is a block diagram showing an arrangement of a reader for facsimile in which a CCD-sensor driving apparatus including additionally a light quantity detecting element is used.
Figure 4A:
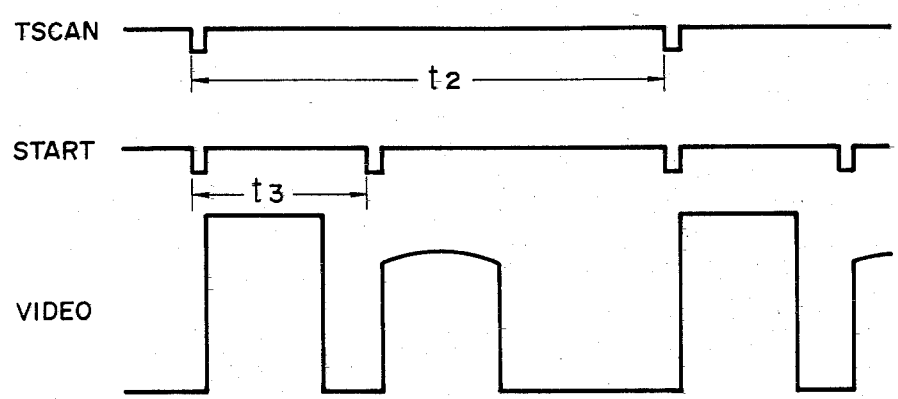
FIG. 4 shows signal waveform diagrams for illustrating operation of the apparatus shown in FIG. 3.
Figure 4B:
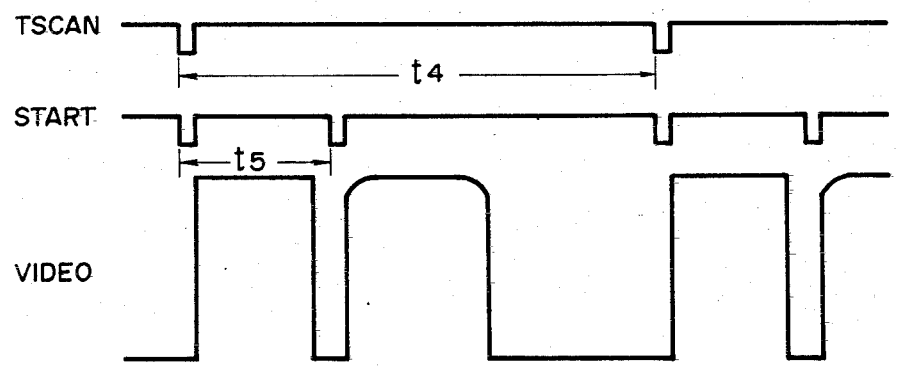

Prior to the description of the embodiments of the invention, an approach to solve the problems mentioned above will be explained by referring to FIGS. 3 and 4 only for the purpose of better understanding of the invention, which is not publicly known before the invention. In FIG. 3, there is shown an arrangement of the reader for the facsimile in which a light quantity detecting element such as a photodiode 9 is additionally incorporated in the CCD driving circuit. Referring to this Figure in which same reference symbols are used for designating the same or equivalent elements to those shown in FIG. 1, the photodiode 9 conducts therethrough a current of magnitude corresponding to the quantity of light emitted by the fluorescent lamp 2 upon appearance of a scan starting command signal "TSCAN", whereby a capacitor C is charged with the current. When the capacitor C is charged to a voltage equal to a reference level $V_{ref}$ determined by voltage division resistors $R_4$ and $R_5$, a storage time control timer 8 is actuated to allow the signal "VIDEO" to be outputted. In FIG. 3, $R_2$ and $R_3$ denote resistors, respectively. FIG. 4 shows signal waveforms for illustrating operation of the apparatus shown in FIG. 3. Referring to FIG. 4 at (a), the scan starting command signal or pulse "TSCAN" is produced periodically at a time interval of $t_2$. Simultaneously with the generation of the pulse signal TSCAN, the signal "START" is produced from the start pulse generator 5 for sweeping away the charge stored in the CCD-sensor 4 until then, whereby the unwanted charge is outputted from the CCD sensor 4 to produce the signal "VIDEO". After lapse of the storage time $t_3$, the storage time control timer 8 is actuated to cause the pulse signal "START" to be again generated, resulting in that the signal "VIDEO" corresponding to the information picked up from the document 1 by the CCD-sensor 4 is produced. The apparatus shown in FIG. 3 suffers from a problem mentioned below. Namely, when the quantity of light produced by the fluorescent lamp 2 is excessively large or when the time interval $t_4$ between the scan starting command signal pulses "TSCAN" is excessively long as compared with the storage time $t_5$, as is illustrated in FIG. 4 at (b), the CCD-sensor 4 can not completely be cleared of the unwanted charge even when the charge stored in the CCD-sensor is driven out simultaneously with generation of the scan starting command signal "TSCAN". As the consequence, the signal "VIDEO" produced again upon lapse of the storage time $t_5$ and representing information of the document 1 is undesirably superposed with the signal component ascribable to the unwanted charge remaining in the CCD-sensor 4, making it impossible or difficult to derive information of the document with reliability and fidelity, to an unsatisfaction.

Refer to for example, Japanese Patent Laid-Open No. 58-48561 dated Mar. 22, 1983 based on Japanese Patent Application No. 56-146213 filed by the present assignee on Sept. 18, 1981.

Figure 1:
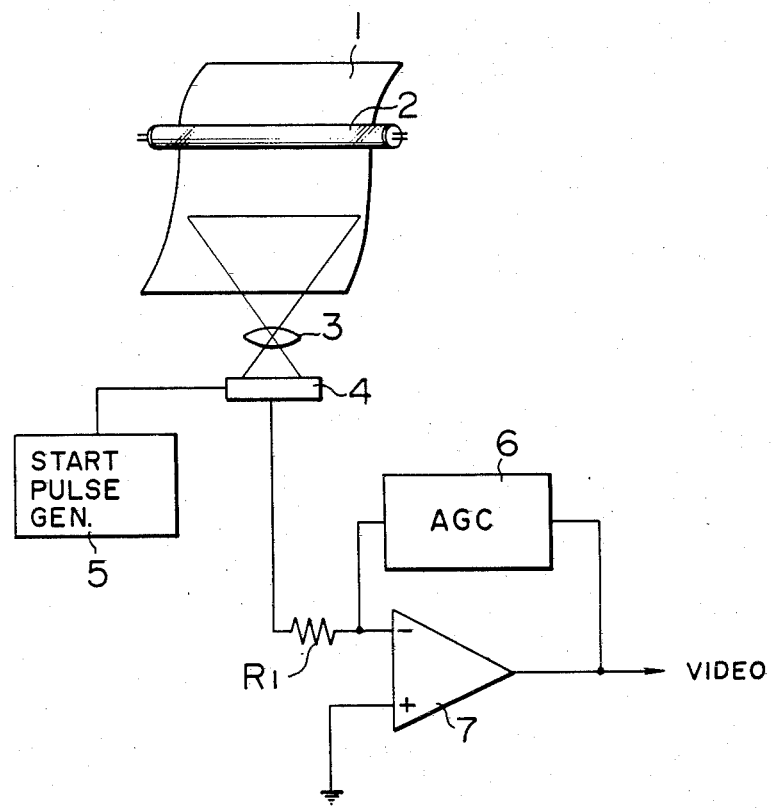
FIG. 1 shows schematically an arrangement of a reader system for facsimile equipment in which a hitherto known CCD-sensor driving apparatus is used.
Figure 2:
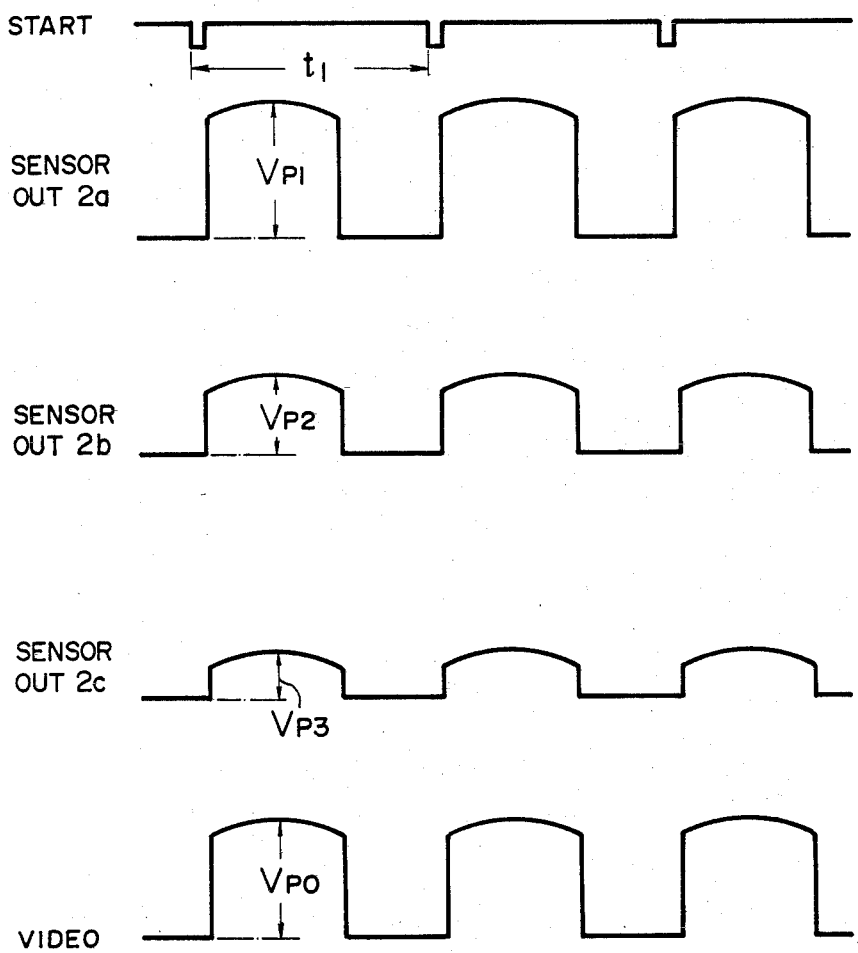
FIG. 2 shows signal waveform diagrams for illustrating operation of the arrangement shown in FIG. 1.
Figure 5:
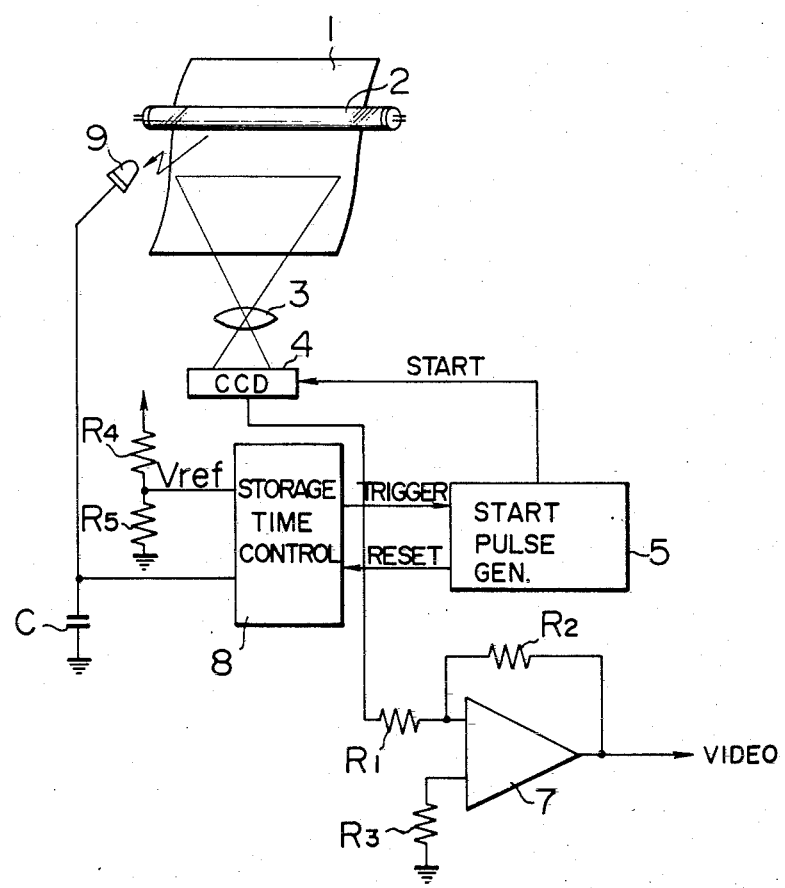
FIG. 5 shows in a block diagram an arrangement of a reader system for facsimile equipment in which a CCD-sensor driving apparatus according to an embodiment of the present invention is used.

Now, an exemplary embodiment of the invention will be described by referring to FIGS. 5 and 6. In FIG. 5 which shows in a block diagram an arrangement of a reader system for facsimile to which a CCD-sensor driving apparatus according to an embodiment of the invention is applied, the same or equivalent elements to those shown in FIG. 1 and FIG. 3 are denoted by like reference numerals and symbols. Information of a document 1 illuminated by a 15-watt fluorescent lamp 2 with a spacing of 10-20 mm to the document is inputted to a CCD-sensor 4 of type HE97132 by Hitachi by way of a lens system 3 to undergo photoelectric conversion through the CCD-sensor 4. The output signal of the CCD-sensor 4 is amplified through an operational amplifier 7 to a level determined by the ratio $R_2/R_1$ of gain setting resistor resistances $R_1$ and $R_2$ to be outputted from the amplifier 7 as a video signal "VIDEO". The CCD-sensor 4 is adapted to output the information picked up from the document 1 in response to a start signal "START" generated by a start pulse generator 5. On the other hand, a capacitor C is charged with a current which flows to a light quantity detecting element such as a photodiode 9 of the type BS500A by Sharp, positioned at a distance of 5 to 10 mm from the fluorescent lamp 2. When the potential appearing across the capacitor C becomes equal to a reference value $V_{ref}$ prepared by voltage divider resistors $R_4$ and $R_5$, a storage or integrating time control timer 8 is actuated, whereupon the start pulse generator 5 is triggered to produce the start pulse signal "START", while the storage time control timer circuit 8 is simultaneously reset to allow the charging of the capacitor C to be again started. This process is repeated, as the operation of the apparatus proceeds with.

Figure 6A:
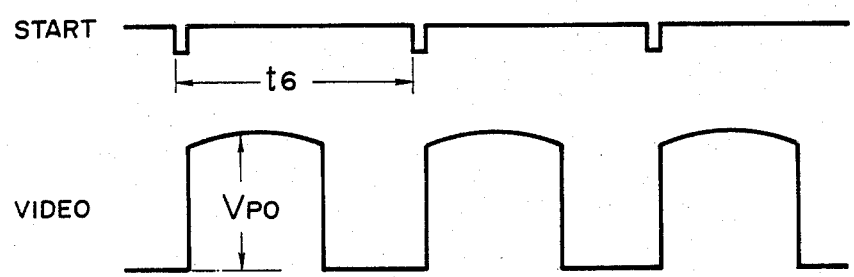
FIG. 6 shows diagrams of signal waveforms for illustrating operation of the apparatus shown in FIG. 5.
Figure 6B:
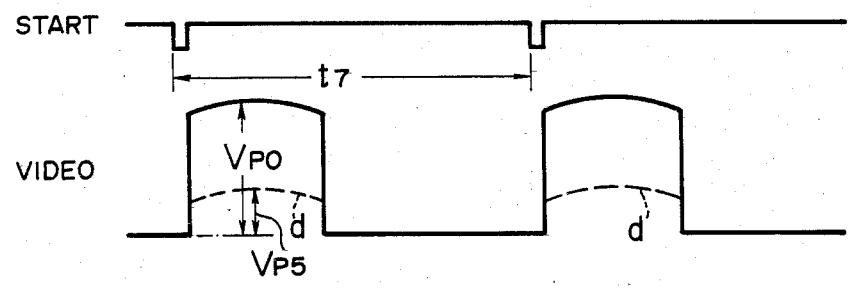
Figure 6C:
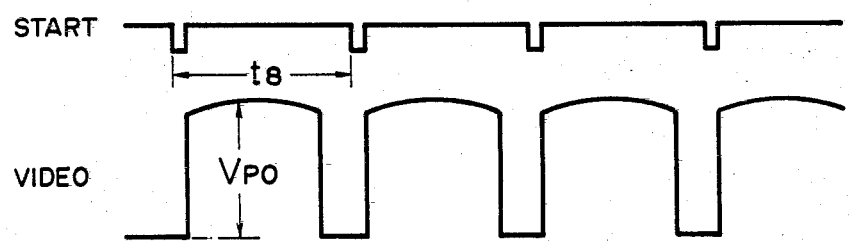

FIG. 6 shows waveforms of the main signals produced in the apparatus shown in FIG. 5. More specifically, there are shown at (a) the waveforms of the start pulse signal "START" and the video signal "VIDEO" produced when white areas of the document 1 are being read under illumination with a standard quantity of light emitted by the fluorescent lamp 2. It will be seen that the start pulse signal "START" is periodically generated by the start pulse generators 5 under the control of the storage time control timer 8 at a time interval which corresponds to the storage time $t_6$ equal to for example, a few milliseconds, whereby the video signal "VIDEO" is also periodically outputted at the same time interval. In other words, the start pulse signal and the video signal have the same period which corresponds to the storage time $t_6$. It should further be noted that the video signal has a peak value $V_{p0}$. There are shown at (b) in FIG. 6 the start pulse signal and the video output signal produced under the same condition except that the quantity of light for illumination is decreased. It will be seen that the storage time $t_7$ becomes correspondingly longer than $t_6$, to thereby assure that the video signal "VIDEO" retains the same peak value as the one shown at (a) even though the quantity of illuminating light is decreased. Shown in FIG. 6 at (c) are the start pulse signal and the video signal produced when the quantity of illuminating light is incrased. It will be seen that the storage time $t_8$ then becomes shorter than $5_6$ to maintain the peak of the video signal "VIDEO" at the same value $V_{p0}$. A waveform d depicted in a broken line curve at (b) in FIG. 6 represents a video signal produced upon reading black (gray) areas of the document 1 under illumination with the decreased quantity of light. It will be appreciated that black information of the document results in the generation of the video signal "VIDEO" having a definite peak value $V_{p5}$ (where $V_{p5} < V_{p0}$) even when the quantity of illuminating light is decreased. In this way, information of the document 1 can be obtained as the video signals having output levels discriminably representing information with high fidelity regardless of variations in the quantity of illuminating light. Since the charge is swept away from the CCD-sensor 4 at a time interval determined in dependence on the quantity of light, there will not arise such a situation in which the CCD-sensor 4 is not completely cleared of the unwanted charge.

From the foregoing, it will be understood that information in black and white contained in the document 1 can be read out with respective definite levels without suffering from adverse influences due to variations in the quantity of light emitted by the fluorescent lamp 2, while the video output signal is maintained constantly steady because the CCD-sensor is cleared of the unwanted charge without fail. Besides, the hardware structure can be realized without involving difficulty and expensiveness because only the storage time control timer and the light quantity detecting element are required for the reading or scanning operation taking place at a time interval determined in dependence on the detected quantity of illuminating light.

Figure 7:
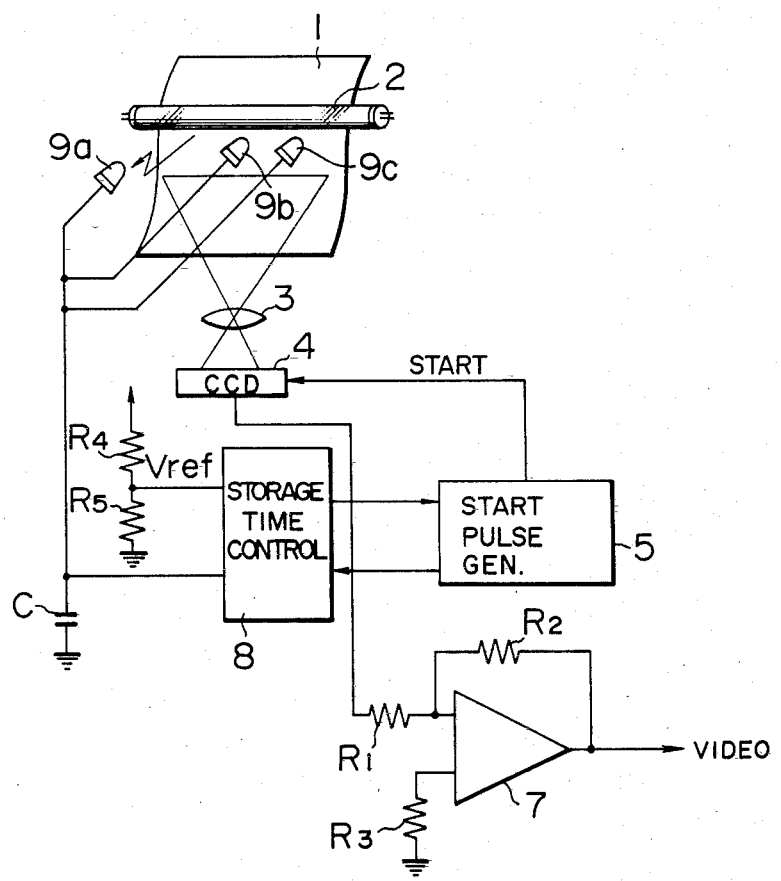
FIGS. 7 to 11 are block diagrams showing, respectively, arrangements of reader systems for facsimile in which CCD-sensor driving apparatus according to other exemplary embodiments of the invention are respectively incorporated.

FIG. 7 shows a modification of the reader system shown in FIG. 5. In constract to the system shown in FIG. 5 where the quantity of light emitted by the fluorescent lamp 2 is detected at a given point located along the length thereof, there are disposed three photodiodes 9a, 9b and 9c at both ends and an intermediate location of the fluorescent lamp 2 in the case of the reader system shown in FIG. 7, wherein the capacitor C is charged with a current generated by these photodiodes in dependence on the quantities of light emitted at the respective locations. When the charged level of the capacitor C becomes equal to a reference voltage $V_{ref}$ prepared by the voltage dividing resistors $R_4$ and $R_5$, the storage time control timer 8 is driven. In this way, the storage time of the CCD-sensor 4 is determined in dependence on the average quantity of light emitted by the fluorescent lamp. Operation following the actuation of the storage time control timer 8 is the same as that of the reader system shown in FIG. 5.

Figure 8:
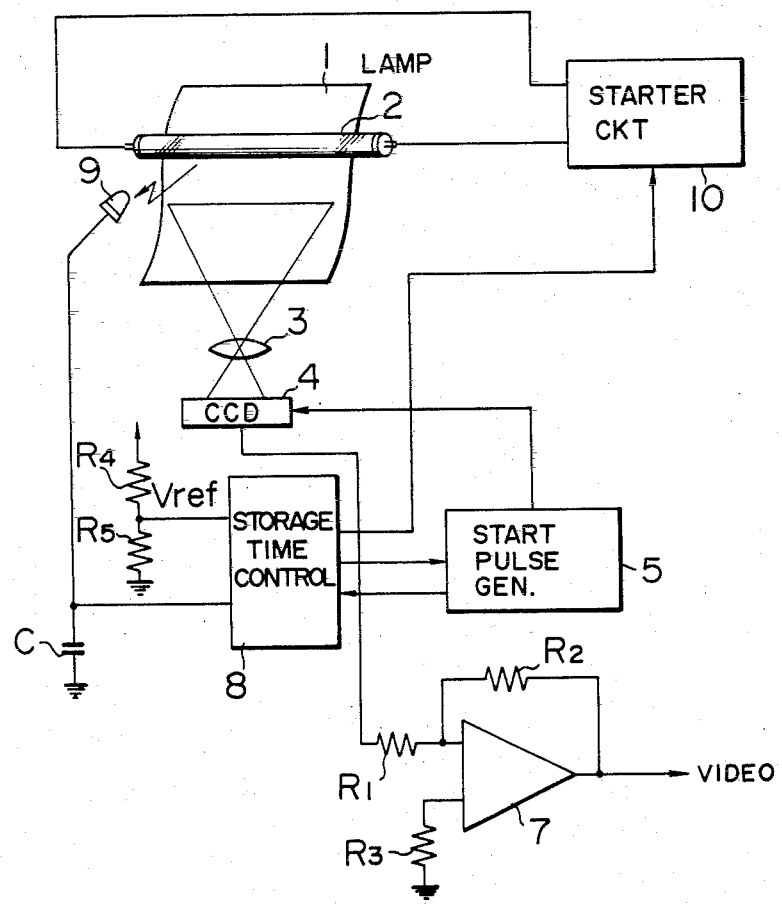

FIG. 8 shows a reader system according to another embodiment of the invention which differs from the arrangement shown in FIG. 5 in that a starter circuit 10 serving for controlling the lamp current is additionally provided, wherein the starter 10 is controlled by the output pulse signal of the storage time control timer 8 of the same arrangement as the one shown in FIG. 5 in such a manner that the lamp current of the lamp 2 is increased as the storage time becomes longer and vice versa.

Figure 9:
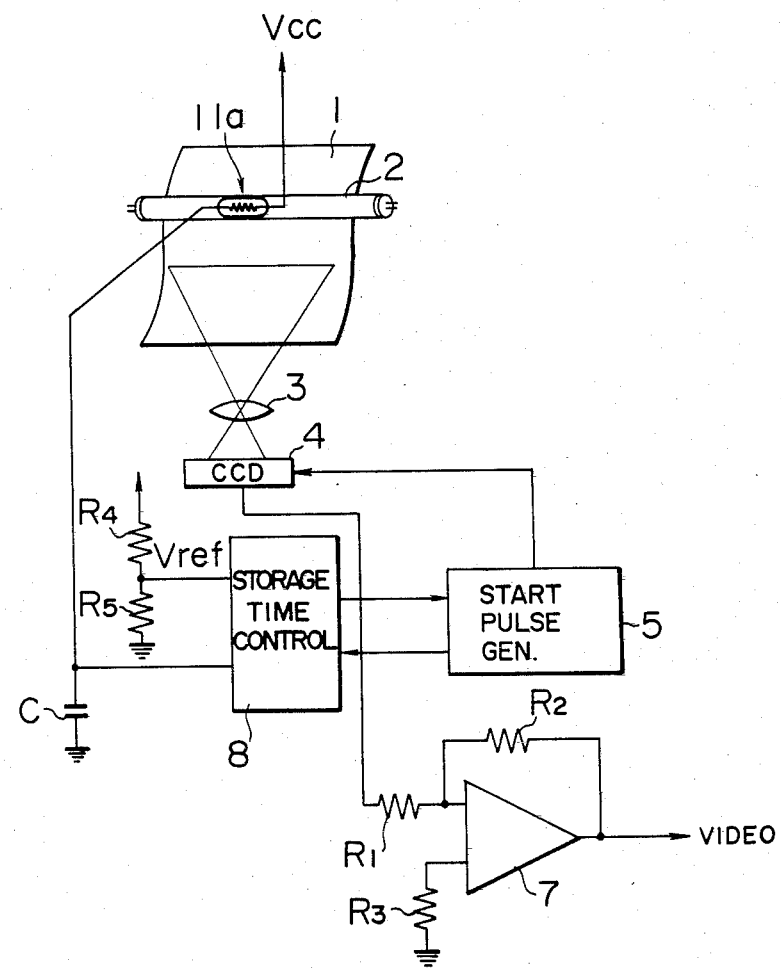

FIG. 9 shows still another embodiment of the invention in which the photodiode is replaced by a thermistor or posistor 11a mounted on the fluorescent lamp 2 so that the capacitor C is charged with a current which is in proportion to the temperature of the fluorescent lamp, by taking advantage of the fact that the quantity of light emitted by the fluorescent lamp remains at a lower level in proportion to the lamp temperature which is low for a period of four or five minutes required for the lamp temperature at the time of lighting to attain a predetermined temperature. Except for this feature, the arrangement and operation of the system shown in FIG. 9 are the same as those of the system shown in FIG. 5.

Figure 10:
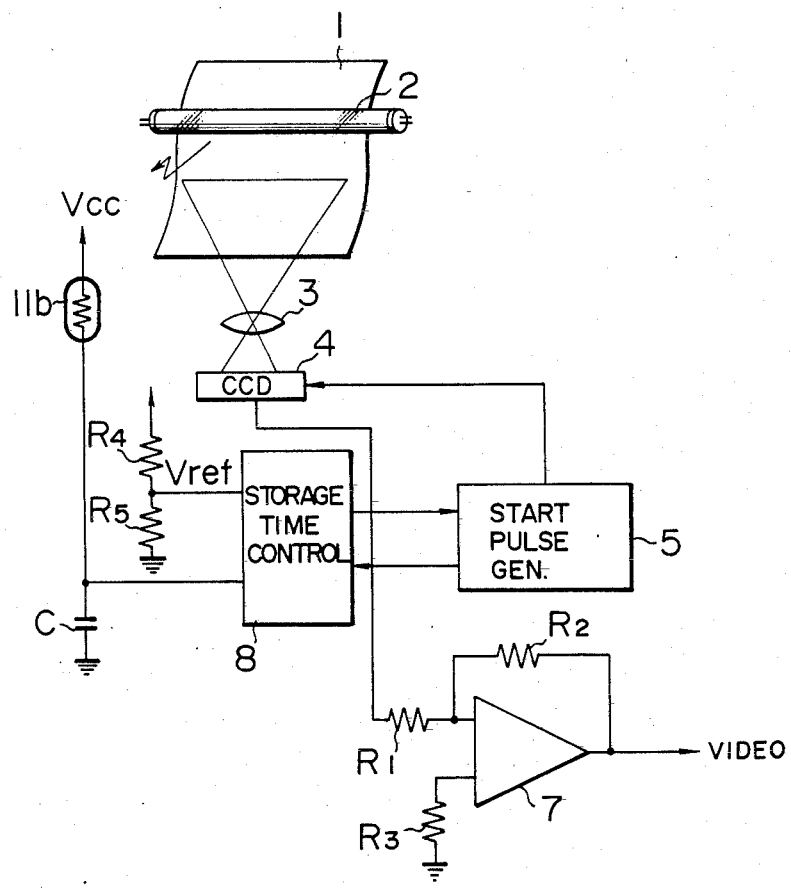

FIG. 10 shows a further embodiment of the invention in which a thermistor 11b for detecting the ambient temperature is provided for controlling the current charging the capacitor C in view of the fact that the ambient temperature exerts influence to the lamp temperature. Except for this point, the storage time of the CCD-sensor 4 is determined in the same manner as described hereinbefore in conjunction with FIG. 5.

Figure 11:
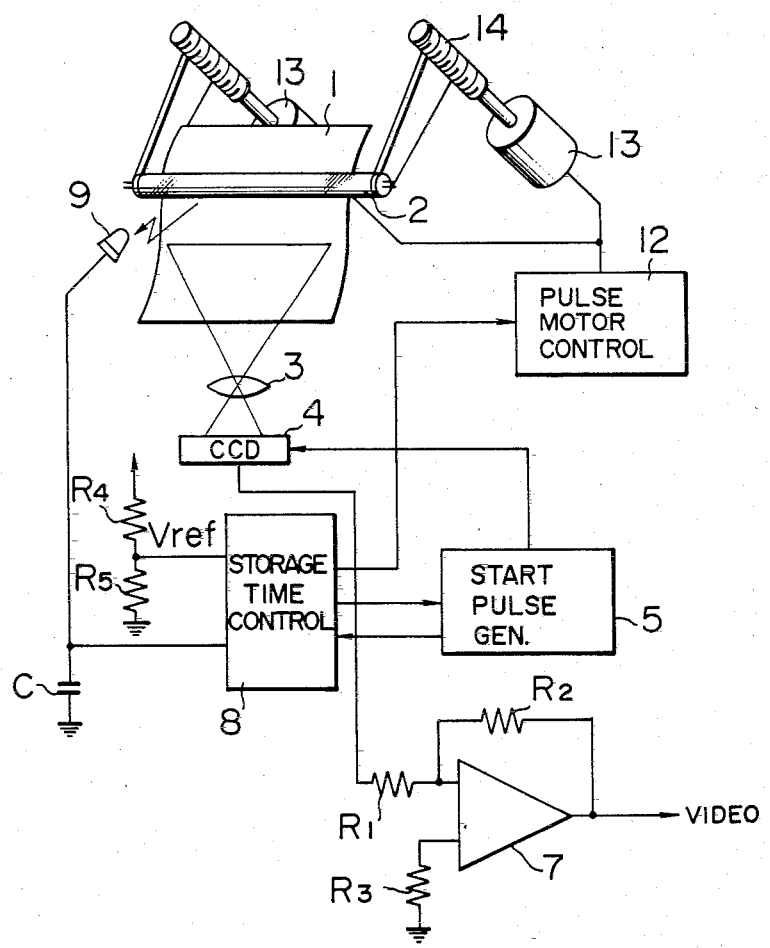

FIG. 11 shows still another embodiment of the invention which is similar to the system shown in FIG. 5 in that the current charging the capacitor C is controlled by means of the photodiode 9 in dependence on the quantity of light emitted by the fluorescent lamp 2 but differs from the latter in that a pulse motor control circuit 12 adapted to be activated by the output pulse of the storage time control timer 8 is provided for driving a pulse motor 13 to thereby vary the distance between the fluorescent lamp 2 and the document 1 by way of an interposed worm gear mechanism 14 for the purpose of preventing the storage time from increasing excessively. From the foregoing, it will be appreciated that the CCD-sensor driving apparatus according to the present invention allows information of documents or the like to be read through photoelectric conversion with improved fidelity and reliability independent of variations in the quantity of light emitted by the light source and thus can enjoy wide variety of applications such as facsimile equipment and others.

We claim:

1. An apparatus for driving a CCD-sensor comprising: light quantity detecting means for detecting the quanity of light emitted by a light source for illuminating a material to be read by the CCD sensor; storage time determining means for determining the storage time of said CCD-sensor on the basis of an output signal from said light quantity detecting means; and driving means responsive to said storage time determining means for driving said CCD sensor periodically at a time interval corresponding to the storage time determined by said storage time determining means.

2. An apparatus according to claim 1, further comprising means coupled to said light source and to said storage time determining means for variably controlling the brightness of the light source on the basis of the output of said storage time determining means to thereby correct the storage time.

3. An apparatus according to claim 1, wherein said means for detecting the quantity of light emitted by said light source comprising temperature sensing means for detecting the ambient temperature of said light source as a representation of the quantity of light emitted by the light source.

4. An apparatus for driving a CCD-sensor, comprising: light quantity detecting means for detecting the quantity of light emitted by a light source; storage time control means for triggering a start pulse generating means coupled to said storage time control means when the output voltage of said light quantity detecting means becomes equal to a reference voltage value means for resetting said storage time control means simultaneously with the generation of a start signal by said start pulse generating means; a CCD-sensor for photoelectrically converting an information signal read from a document illuminated by said light source into an electric signal in response to said start signal; and output amplifier means for extracting said photoelectrically converted information signal as a video output signal.

5. A CCD-sensor driving apparatus according to claim 4, wherein a plurality of light quantity detecting means are disposed on said light source, the storage time of said CCD sensor being determined on the basis of an averaged detection output of said plurality of light quantity detecting means.

6. An apparatus according to claim 4, further comprising a capacitor coupled to said light quantity detecting means for storing a charge equivalent to the detected light quantity, wherein said storage time control means triggers the start pulse generating means when a voltage level of said capacitor from the stored charge equals said reference voltage level.

7. An apparatus for driving a CCD-sensor of a reader system for facsimile equipment for reading a document containing information, which facsimile equipment includes a light source for emitting light to illuminate said document to be read and said CCD-sensor for sensing light from said document illuminated by said light source, wherein said driving apparatus comprises:
- light quantity detecting means for detecting the quantity of light emitted by said light source of said facsimile equipment;
- storage time determining means for determining the storage time of said CCD-sensor on the basis of an output signal from said light quantity detecting means; and
- driving means responsive to said storage time determining means for driving said CCD-sensor periodically at a time interval corresponding to the storage time determined by said storage time determining means.

8. An apparatus according to claim 7, wherein said driving means comprises a start pulse generating means for generating a start signal to drive said CCD-sensor, and wherein said storage time determining means comprises a storage time control means for triggering said start pulse generating means when the output voltage of said light quantity detecting means equals a reference voltage value, said apparatus further comprising means for resetting said storage time determining means simultaneously with the generation of the start signal by said start pulse generating means.

9. An apparatus according to claim 8, further comprising a capacitor coupled to said light quantity detecting means for storing a charge equivalent ot the detected light quantity, wherein said storage time control means triggers the start pulse generating means when a voltage level of said capacitor from the stored charge equals said reference voltage level.

* * * * *